United States Patent
Peng

(10) Patent No.: US 8,564,537 B2
(45) Date of Patent: Oct. 22, 2013

(54) WHEEL MODULE FOR INPUT DEVICE

(75) Inventor: Chun-Ching Peng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 188 days.

(21) Appl. No.: 13/241,902

(22) Filed: Sep. 23, 2011

(65) Prior Publication Data

US 2013/0027305 A1 Jan. 31, 2013

(30) Foreign Application Priority Data

Jul. 29, 2011 (TW) .............................. 100126977 A

(51) Int. Cl.
*G06F 3/033* (2013.01)
*G09G 5/08* (2006.01)

(52) U.S. Cl.
USPC ........................................................ 345/163

(58) Field of Classification Search
USPC ................ 345/163–169; 200/175–176, 61.39
See application file for complete search history.

(56) References Cited

U.S. PATENT DOCUMENTS 8,169,403 B2 * 5/2012 Chou ............................ 345/157
2007/0159462 A1 * 7/2007 Yen et al. ...................... 345/163

* cited by examiner

*Primary Examiner* — Bipin Shalwala
*Assistant Examiner* — Hang Lin
(74) *Attorney, Agent, or Firm* — Kirton McConkie; Evan R. Witt

(57) ABSTRACT

A wheel module for an input device includes a circuit board, a wheel swinging member, and a wheel. A plurality of switch elements are installed on the circuit board. These switch elements are arranged between the circuit board and the wheel swinging member. The wheel is disposed on the wheel swinging member. When the wheel is moved downwardly relative to the wheel swinging member by a specified distance, an operating mode of the wheel module is switched from a rotating mode to a swinging mode. When the wheel module is operated in the rotating mode, the wheel is rotatable relative to the wheel swinging member. When the wheel module is operated in the swinging mode and the wheel is tilted in a specified direction, the wheel swinging member is synchronously swung relative to the circuit board to trigger a corresponding switch element.

13 Claims, 10 Drawing Sheets

WHEEL MODULE FOR INPUT DEVICE

FIELD OF THE INVENTION

The present invention relates to a wheel module, and more particularly to a wheel module for an input device.

BACKGROUND OF THE INVENTION

With increasing development of scientific technologies, multimedia products and computers become essential in our daily lives. In the computer systems, peripheral input devices play important roles for communicating the computer systems and the users. The common peripheral input devices of the computer systems include for example mice, keyboards, microphones, or the like. When a mouse is held on the palm of a user's hand, the user may move the mouse to control movement of the cursor shown on the computer screen. As the cursor is moved, the motion trajectory of the mouse cursor is shown on the computer screen. Since mice are very easy-to-use and can comply with the usual practices of most users, mice are the most prevailing among these peripheral input devices.

Generally, during a document file or a web page is browsed by a user, if the document file or the web page is too large, the image frame shown on the computer screen need to be scrolled in a vertical direction and a horizontal direction, so that the whole contents can be browsed by the user. Since the wheel of a conventional mouse device permits for single axial rotation, the image frame shown on the computer screen can only be vertically scrolled. For performing the horizontal scrolling operation, the left click button of the mouse should be continuously pressed down while the mouse is moved in the horizontal direction. Since the single axial rotation of the mouse is unsatisfactory for the user to browse the document file or the web page, a tilt wheel mouse is developed for controlling horizontal scroll movement of the image shown on the computer screen.

FIG. 1 is a schematic perspective view illustrating the outward appearance of a conventional wheel mouse. As shown in FIG. 1, the tilt wheel mouse 1 comprises a casing 10 and a wheel 11. The casing 10 has an opening 101. Through the opening 101, the wheel 11 is protruded from an outer surface of the casing 10, so that the wheel 11 can be manipulated by a user. By rotating the wheel 11 forwardly (in the direction D1) or backwardly (in the direction D2), the tilt wheel mouse 1 generates a first control signal. According to the first control signal, the computer executes a first command of vertically scrolling the image frame shown on the computer screen for example. By tilting the wheel 11 toward the left side (in the direction D3) or the right side (in the direction D4), the tilt wheel mouse 1 generates a second control signal. According to the second control signal, the computer executes a second command of horizontally scrolling the image frame shown on the computer screen for example.

Although the wheel 11 of the conventional tilt wheel mouse can be rotated forwardly (in the direction D1) or backwardly (in the direction D2) and tilted toward the left side (in the direction D3) or the right side (in the direction D4), there are still some drawbacks. For example, during the wheel 11 is tilted toward the left side or the right side by the user's finger, the wheel 11 may be simultaneously rotated forwardly or backwardly because the depressing force resulting from the user's finger is improperly exerted on the wheel 11. Under this circumstance, the first control signal and the second control signal are accommodated by the computer at the same time. Since the computer fails to judge which command should be executed, the tilt wheel mouse 1 is readily suffered from an erroneous operation. This erroneous operation may bring about considerable trouble to the user.

Nowadays, as the professional computer software becomes more and more diverse, its functionality is increased but the operations of the software are more complicated. Since the wheel of the conventional tilt wheel mouse is permitted to be rotated forwardly and backwardly or tilted toward the left side and the right side, the functions provided by the conventional tilt wheel mouse fail to meet the requirements of most users. Therefore, the conventional tilt wheel mouse needs to be further improved.

SUMMARY OF THE INVENTION

The present invention relates to a wheel module for an input device, and more particularly to a wheel module with a joystick function.

In accordance with an aspect of the present invention, there is provided a wheel module for an input device. The wheel module includes a circuit board, a wheel swinging member, a wheel and a first elastic member. At least one switch element is installed on the circuit board. The wheel swinging member is disposed over the circuit board, so that the at least one switch element is arranged between the circuit board and the wheel swinging member. The wheel is disposed on the wheel swinging member. When the wheel is moved downwardly relative to the wheel swinging member by a specified distance in response to an external force exerted on the wheel, an operating mode of the wheel module is switched from a rotating mode to a swinging mode. The first elastic member is used for providing a first elastic force to the wheel. When the external force exerted on the wheel is eliminated, the first elastic force causes the wheel to be moved upwardly relative to the wheel swinging member. When the wheel module is operated in the rotating mode, the wheel is rotatable relative to the wheel swinging member. Whereas, when the wheel module is operated in the swinging mode and the wheel is tilted in a specified direction, the wheel swinging member is synchronously swung relative to the circuit board to trigger the at least one switch element.

In an embodiment, the wheel has an operating surface to be manipulated by a user. The operating surface has a plurality of concave structures. The wheel swinging member has a convex structure disposed under the wheel. When the wheel module is operated in the swinging mode, the convex structure is accommodated within one of the concave structures.

In an embodiment, the wheel has an operating surface to be manipulated by a user, and a friction-enhancing member is disposed on a top surface of the wheel swinging member. When the wheel module is operated in the swinging mode, the wheel is contacted with the friction-enhancing member.

In an embodiment, the wheel swinging member has a first supporting member and a second supporting member. The wheel has a wheel shaft, and both ends of the wheel shaft are supported by the first supporting member and the second supporting member, respectively.

In an embodiment, the wheel module includes an encoder. When the wheel is rotated, the encoder generates a corresponding rotation signal.

In an embodiment, the first supporting member has a first position-limiting slot, the second supporting member has a second position-limiting slot, and the both ends of the wheel shaft are inserted into the first position-limiting slot and the second position-limiting slot, respectively. The both ends of the wheel shaft are limited to be moved within the first position-limiting slot and the second position-limiting slot.

In an embodiment, the first elastic member is an elastic strip, which is disposed around and fixed on the first supporting member and the second supporting member for supporting the both ends of the wheel shaft.

In an embodiment, the at least one switch element includes a first switch element, a second switch element, a third switch element and a fourth switch element, which are respectively located at a front side, a rear side, a left side and a right side of the circuit board. A first triggering part, a second triggering part, a third triggering part and a fourth triggering part are respectively disposed on a bottom surface of the wheel swinging member at positions corresponding to the first switch element, the second switch element, the third switch element and the fourth switch element.

In an embodiment, the wheel module further includes a second elastic member, which is arranged between the wheel swinging member and the circuit board for providing a second elastic force to the wheel swinging member.

In an embodiment, an elasticity coefficient of the second elastic member is greater than an elasticity coefficient of the first elastic member.

In an embodiment, the second elastic member is a push switch element. Corresponding to the push switch element, a push triggering part is disposed on a bottom surface of the wheel swinging member.

In an embodiment, the second elastic member is made of a rubbery material.

In an embodiment, the at least one switch element is a resistive pressure sensor or a capacitive pressure sensor.

In an embodiment, the input device further includes a casing, and an opening is formed in a top surface of the casing, wherein the wheel is partially exposed outside the casing through the opening.

In an embodiment, the input device is a mouse device, a keyboard device or a mobile communication device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a wheel module. By operating the wheel module, a corresponding electronic device can be controlled. The wheel module may be installed in various input devices such as mouse devices, keyboard devices, mobile phones or personal digital assistants (PDA). The applications of the wheel module are not restricted to these input devices.

Figure 1:
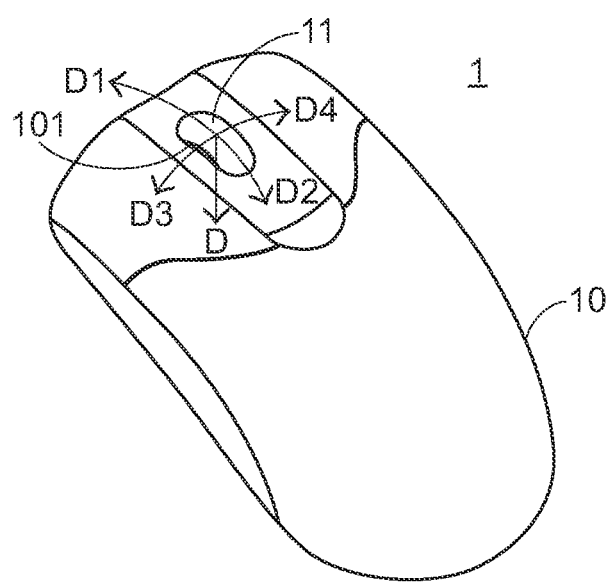
FIG. 1 is a schematic perspective view illustrating the outward appearance of a conventional wheel mouse.
Figure 2:
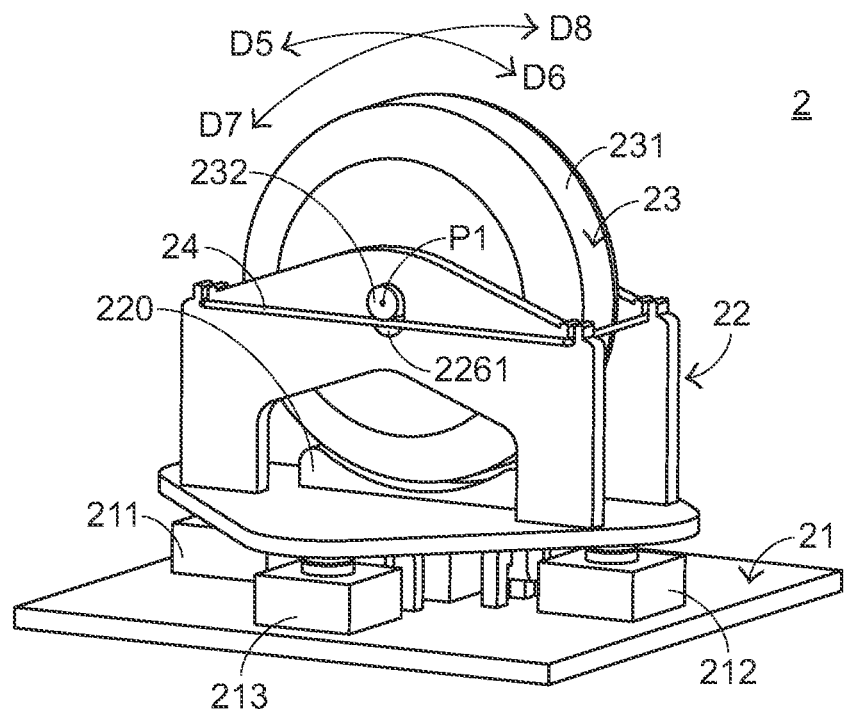
FIG. 2 is a schematic perspective view illustrating a wheel module for an input device according to a first embodiment of the present invention.
Figure 3:
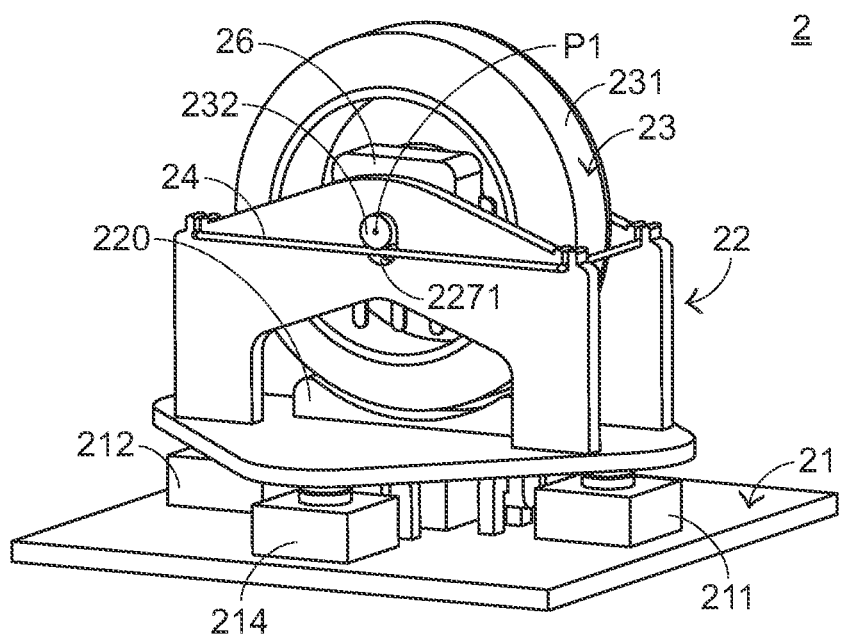
FIG. 3 is a schematic perspective view illustrating the wheel module as shown in FIG. 2 and taken along another viewpoint.
Figure 4:
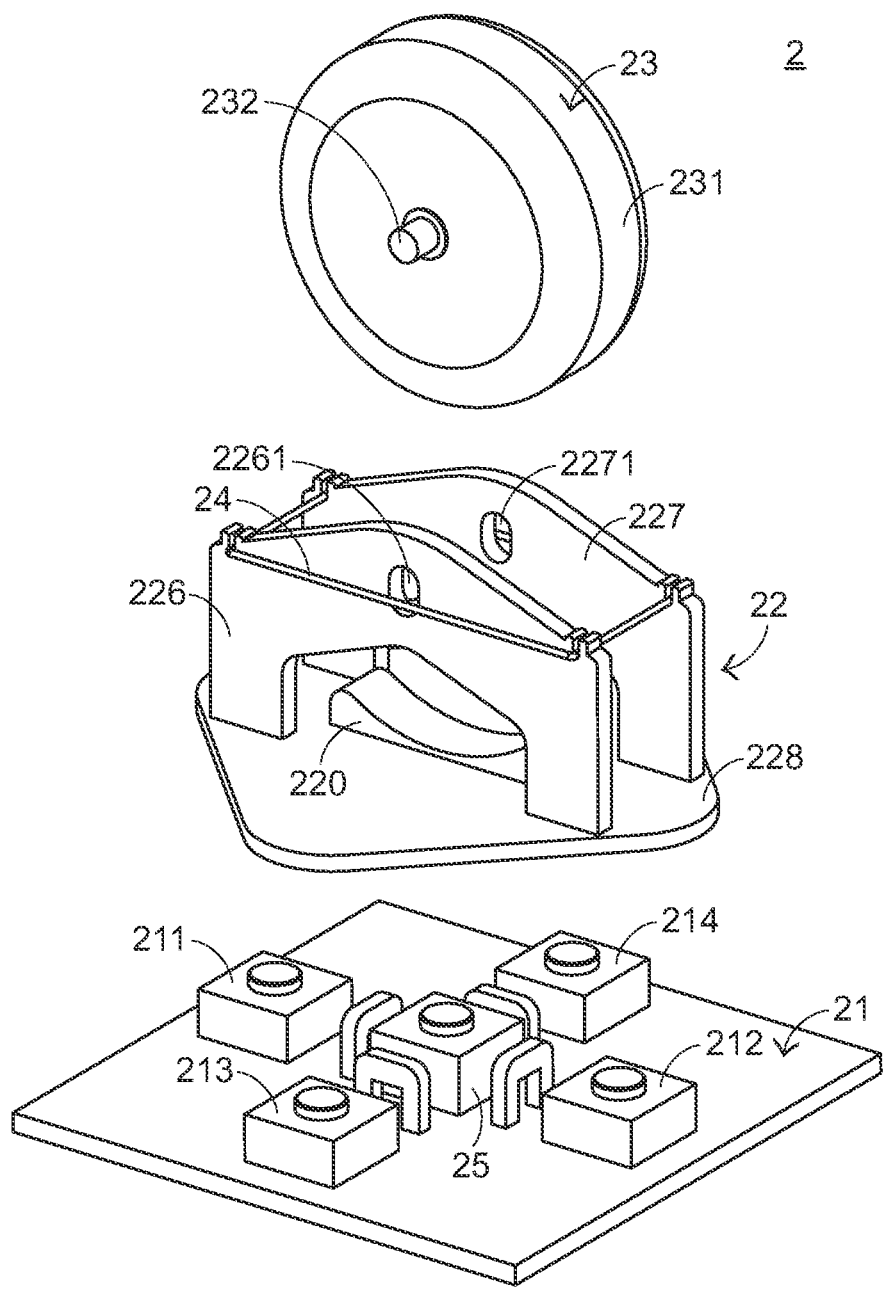
FIG. 4 is a schematic three-dimensional exploded view illustrating the wheel module as shown in FIG. 2.
Figure 5:
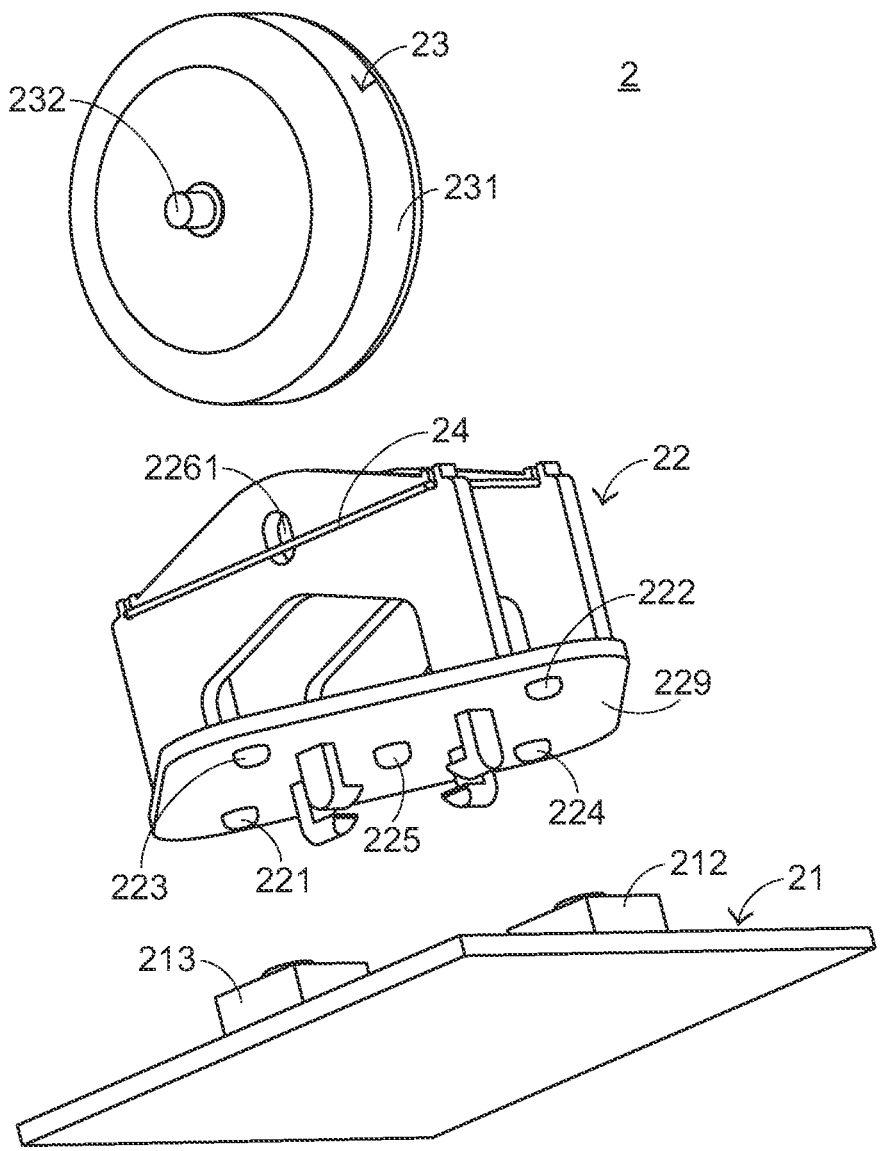
FIG. 5 is a schematic three-dimensional exploded view illustrating the wheel module as shown in FIG. 2 and taken along another viewpoint.

FIG. 2 is a schematic perspective view illustrating a wheel module for an input device according to a first embodiment of the present invention. FIG. 3 is a schematic perspective view illustrating the wheel module as shown in FIG. 2 and taken along another viewpoint. FIG. 4 is a schematic three-dimensional exploded view illustrating the wheel module as shown in FIG. 2. FIG. 5 is a schematic three-dimensional exploded view illustrating the wheel module as shown in FIG. 2 and taken along another viewpoint. Please refer to FIGS. 2, 3, 4 and 5. The wheel module 2 comprises a circuit board 21, a wheel swinging member 22, a wheel 23, a first elastic member 24, a second elastic member 25 and an encoder 26. The wheel swinging member 22 is disposed on the circuit board 21. The wheel 23 is disposed on the wheel swinging member 22, and has an operating surface 231. Moreover, at least one switch element 211~214 is installed on the circuit board 21, and arranged between the circuit board 21 and the wheel swinging member 22. The wheel 23 is rotatable relative to the wheel swinging member 22. The encoder 26 is connected with the wheel 23, and can be synchronously moved upwardly and downwardly with the wheel 23. Moreover, according to the rotating distance or the rotating speed of the wheel 23, the encoder 26 generates a rotation signal. In a case that the wheel 23 is moved by a user's finger to be tilted in a specified direction, the wheel swinging member 22 is synchronously swung relative to the circuit board 21, so that the at least one switch element 211~214 is triggered the wheel swinging member 22. In a case that the wheel 23 is no longer moved by the user's finger, the elastic force resulting from the second elastic member 24 causes the wheel swinging member 22 to be returned to its original position. Moreover, according to the above-mentioned rotation signal or the triggering status of any switch element 211~214, a corresponding control signal is outputted from the input device (not shown) to an electronic device (not shown), which is in communication with the input device. The electronic device is for example a computer.

In the first embodiment, a first switch element 211, a second switch element 212, a third switch element 213 and a fourth switch element 214 are located at a front side, a rear side, a left side and a right side of the circuit board 21, respectively. Moreover, a first triggering part 221, a second triggering part 222, a third triggering part 223 and a fourth triggering part 224 are disposed on a bottom surface 229 of the wheel swinging member 22 at the positions corresponding to the first switch element 211, the second switch element 212, the third switch element 213 and the fourth switch element 214, respectively. In a case that the wheel 23 is moved by the user's finger to be tilted in a direction D5, the wheel swinging member 22 is synchronously swung relative to the circuit board 21 in the direction D5, and thus the first switch element 211 is triggered by the first triggering part 221. In a case that the wheel 23 is moved by the user's finger to be tilted in a direction D6, the wheel swinging member 22 is synchronously swung relative to the circuit board 21 in the direction D6, and thus the second switch element 212 is triggered by the second triggering part 222. In a case that the wheel 23 is moved by the user's finger to be tilted in a direction D7, the wheel swinging member 22 is synchronously swung relative to the circuit board 21 in the direction D7, and thus the third switch element 213 is triggered by the third triggering part 223. In a case that the wheel 23 is moved by the user's finger to be tilted in a direction D8, the wheel swinging member 22 is synchronously swung relative to the circuit board 21 in the direction D8, and thus the fourth switch element 214 is triggered by the fourth triggering part 224.

Moreover, in the first embodiment, the second elastic member 25 is a push switch element with a rubbery shell. The second elastic member 25 is installed on the circuit board 21, and located at a central position relative to the first switch element 211, the second switch element 212, the third switch element 213 and the fourth switch element 214. Moreover, the push switch element is located at a level higher than each of the first switch element 211, the second switch element 212, the third switch element 213 and the fourth switch element 214. In addition, a push triggering part 225 is disposed on the bottom surface 229 of the wheel swinging member 22 and in contact with the push switch element. In a case that the wheel 23 is pressed down by the user to be moved downwardly, the wheel swinging member 22 is synchronously moved downwardly, and thus the push switch element is triggered by the push triggering part 225. Moreover, regardless of whether the wheel 23 is tilted in any direction or moved downwardly, when the force exerted on the wheel 23 is eliminated, the second elastic member 25 provides a second elastic force to the wheel swinging member 22 because the external shell of the push switch element is made of a rubbery material. Due to the elastic force, the wheel swinging member 22 is restored to the non-swinging state.

Moreover, in the first embodiment, a first supporting member 226, a second supporting member 227 and a friction-enhancing member 220 are disposed on a top surface 228 of the wheel swinging member 22. In addition, the friction-enhancing member 220 has a high friction coefficient and is disposed under the wheel 23. The first supporting member 226 has a first position-limiting slot 2261. The second supporting member 227 has a second position-limiting slot 2271. The wheel 23 has a wheel shaft 232 penetrated through the encoder 26. The both ends of the wheel shaft 232 are inserted into the first position-limiting slot 2261 and the second position-limiting slot 2271, respectively. The first position-limiting slot 2261 and the second position-limiting slot 2271 are used for limiting the both ends of the wheel shaft 232 to be moved within the first position-limiting slot 2261 and the second position-limiting slot 2271, respectively. The first elastic member 24 is an elastic strip, which is disposed around and fixed on the first supporting member 226 and the second supporting member 227. The first elastic member 24 is used for supporting the both ends of the wheel shaft 232, so that the both ends of the wheel shaft 232 are located at a first position P1 of the first position-limiting slot 2261 and the second position-limiting slot 2271. For enhancing the performance of the wheel module 2, the elasticity coefficient of the second elastic member 25 of the wheel module 2 is greater than the elasticity coefficient of the first elastic member 24. The reason will be described later.

Figure 6A:
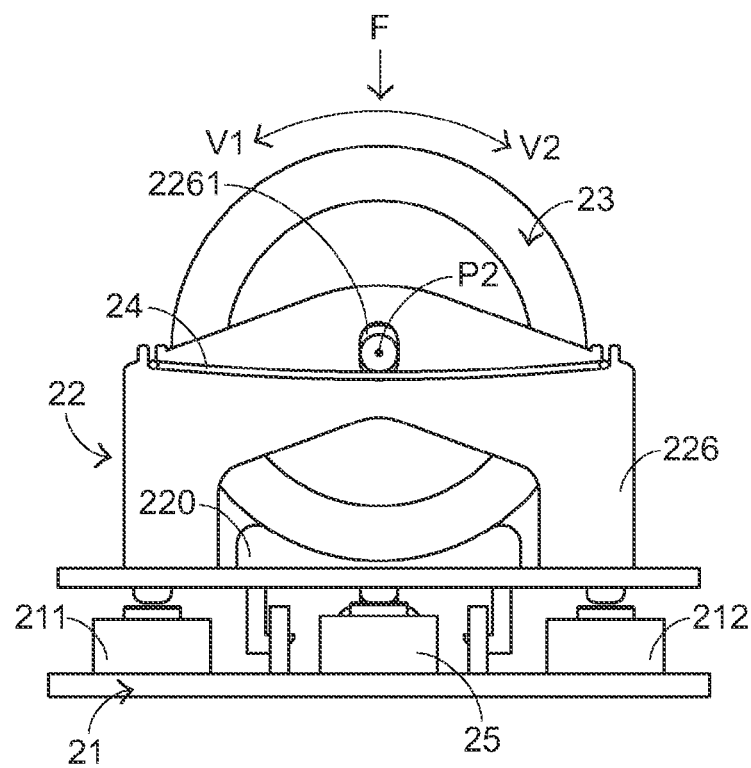
FIG. 6A schematically illustrates the wheel module of FIG. 2, in which the wheel module is operated in a swinging mode.

FIG. 6A schematically illustrates the wheel module of FIG. 2, in which the wheel module is operated in a swinging mode. In response to an external force F exerted on the wheel 23, the wheel 23 is moved downwardly to a specified distance L relative to the wheel swinging member 22. That is, the both ends of the wheel shaft 232 are moved from the first position P1 of the first position-limiting slot 2261 and the second position-limiting slot 2271 to a second position P2 of the first position-limiting slot 2261 and the second position-limiting slot 2271. Meanwhile, the operating surface 231 of the wheel 23 is contacted with the friction-enhancing member 220. Due to the high friction coefficient of the friction-enhancing member 220, it is difficult to rotate the wheel 23 relative to the wheel swinging member 22 in a rotating direction V1 or a rotating direction V2. Under this circumstance, the wheel module 2 is operated in a swinging mode. Meanwhile, the wheel 23 may be tilted in one of the directions D5, D6, D7 and D8, and thus the wheel swinging member 22 is correspondingly swung. Consequently, the switch elements 211~214 are triggered by corresponding triggering parts 221~224.

It is noted that the external force F should be greater than the first elastic force of the first elastic member 24. In such way, the wheel 23 is movable downwardly relative to the wheel swinging member 22. Since the elasticity coefficient of the second elastic member 25 is greater than the elasticity coefficient of the first elastic member 24, when the external force F is exerted on the wheel 23, the wheel 23 is only permitted to be moved relative to the wheel swinging member 22 without causing the heel swinging member 22 to be swung relative to the circuit board 21. Under this circumstance, all of the first switch element 211, the second switch element 212, the third switch element 213, the fourth switch element 214 and the push switch element will no longer be erroneously triggered. Moreover, when the wheel module 2 is operated in the swinging mode, an additional external force greater than the second elastic force of the second elastic member 25 should be exerted on the wheel 23 in order to swing the wheel swinging member 22 relative to the circuit board to trigger the corresponding switch element 211~214.

Figure 6B:
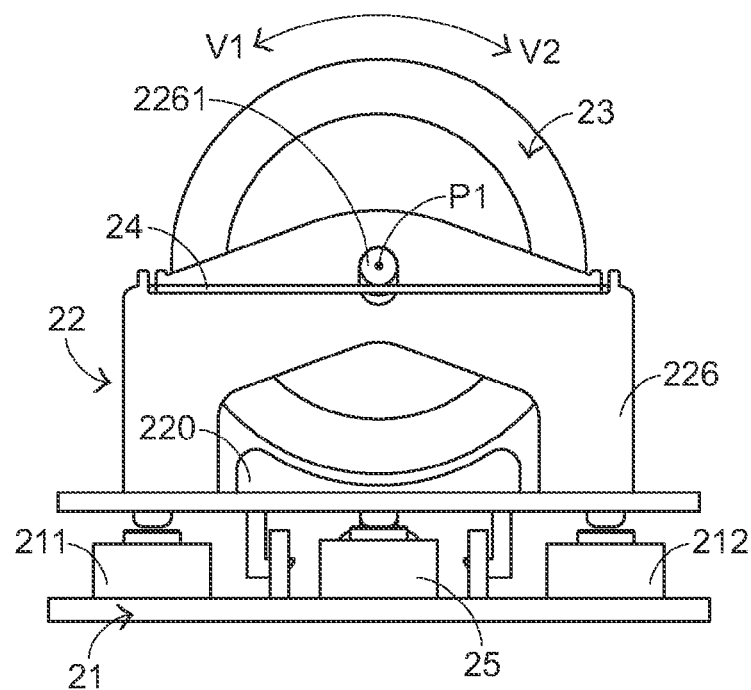
FIG. 6B schematically illustrates the wheel module of FIG. 2, in which the wheel module is operated in a rotating mode.

FIG. 6B schematically illustrates the wheel module of FIG. 2, in which the wheel module is operated in a rotating mode. In a case that the external force F exerted on the wheel 23 is eliminated, the wheel module 2 is operated in a rotating mode. In response to the first elastic force provided by the first elastic member 24, the both ends of the wheel shaft 232 are moved to the first position P1 of the first position-limiting slot 2261 and the second position-limiting slot 2271. Meanwhile, the operating surface 231 of the wheel 23 is separated from the friction-enhancing member 220, so that the wheel 23 is rotatable relative to the wheel swinging member 22 in the rotating direction V1 or the rotating direction V2. That is, when the operating surface 231 of the wheel 23 is separated from the friction-enhancing member 220, the wheel module 2 is operated in a rotating mode.

By the way, when the user wants to trigger any of the first switch element 211, the second switch element 212, the third switch element 213, the fourth switch element 214 and the push switch element, the user may firstly exert the external force F to press down the wheel 23, so that the wheel swinging member 22 is operated in the swinging mode. Then, the additional external force is exerted on the wheel 23 to tilt the wheel 23 in the corresponding direction or move the wheel 23 downwardly. Consequently, even if the force is improperly exerted on the wheel 23, the wheel 23 is not synchronously rotated. Under this circumstance, the rotation of the wheel 23 and the swinging action or downward motion of the swing 23 do not occur simultaneously. As a consequence, the electronic device in communication with the input device will not simultaneously receive two or more control signals. Since the electronic device can judge which command should be executed, the possibility of resulting in the erroneous operation will be minimized.

Figure 7:
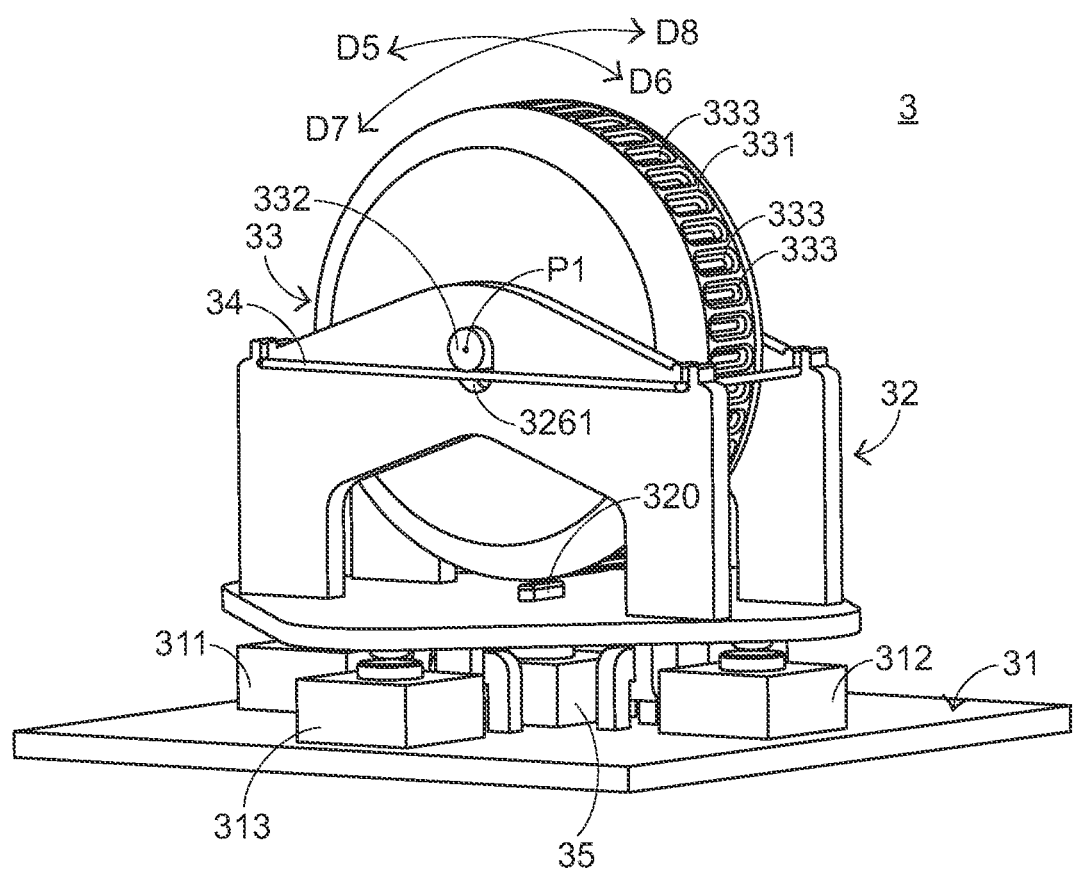
FIG. 7 is a schematic perspective view illustrating a wheel module for an input device according to a second embodiment of the present invention.

FIG. 7 is a schematic perspective view illustrating a wheel module for an input device according to a second embodiment of the present invention. Like the wheel module of the first embodiment, the wheel module 3 of FIG. 7 comprises a circuit board 31, a wheel swinging member 32, a wheel 33, a first elastic member 34, a second elastic member 35 and an encoder (not shown). The wheel swinging member 32 is disposed on the circuit board 31. The wheel 33 is disposed on the wheel swinging member 32, and has an operating surface 331. In addition, a first switch element 311, a second switch element 312, a third switch element 313 and a fourth switch element are disposed on the circuit board 31. Due to the viewpoint, the fourth switch element is not shown. The components similar to those of the first embodiment are not redundantly described herein.

In comparison with the first embodiment, the operating surface 331 of the wheel 33 of the wheel module 3 has a plurality of concave structures 333. In addition, the wheel swinging member 32 has a convex structure 320, which is disposed under the wheel 33.

Figure 8A:
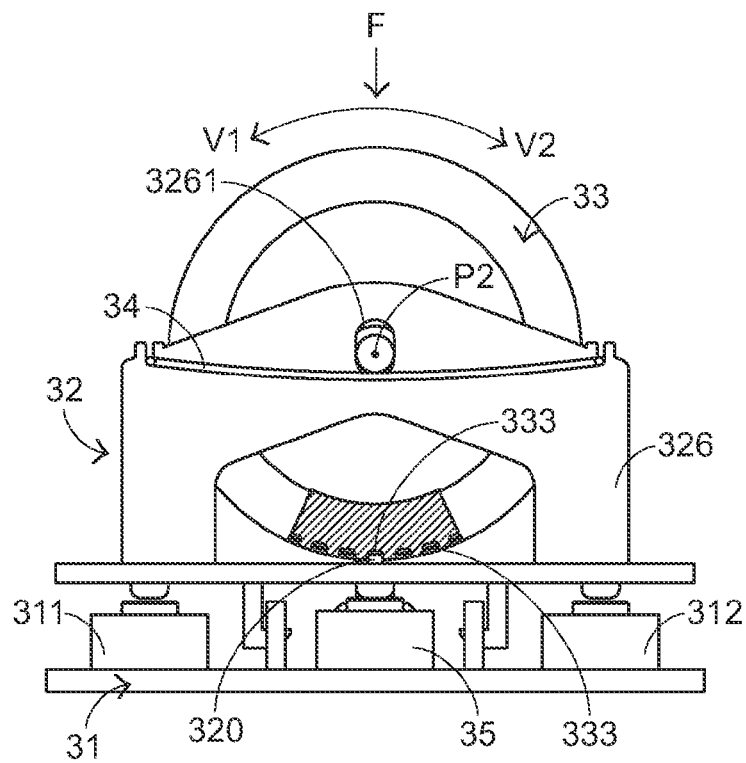
FIG. 8A schematically illustrates the wheel module of FIG. 7, in which the wheel module is operated in a swinging mode.

FIG. 8A schematically illustrates the wheel module of FIG. 7, in which the wheel module is operated in a swinging mode. As shown in FIG. 8A, the region marked by oblique lines denotes a partial cross section of the wheel 33. In response to an external force F exerted on the wheel 33, the wheel 33 is moved downwardly to a specified distance L relative to the wheel swinging member 32. That is, the both ends of the wheel shaft 332 are moved from the first position P1 of the first position-limiting slot 3261 and the second position-limiting slot 3271 to a second position P2 of the first position-limiting slot 3261 and the second position-limiting slot 3271. Meanwhile, the convex structure 320 of the wheel swinging member 32 is accommodated within one of the concave structures 333 of the operating surface 331 of the wheel 33. As consequence, the wheel 33 is non-rotatable, and the wheel module 3 is operated in a swinging mode. Meanwhile, the wheel 33 may be tilted in one of the directions D5, D6, D7 and D8, and thus the wheel swinging member 32 is correspondingly swung. Consequently, the switch elements 311~314 are triggered by corresponding triggering parts 321~324.

Similarly, the external force F should be greater than the first elastic force of the first elastic member 34. In such way, the wheel 33 is movable downwardly relative to the wheel swinging member 32. Since the elasticity coefficient of the second elastic member 35 is greater than the elasticity coefficient of the first elastic member 34, when the external force F is exerted on the wheel 33, the wheel 33 is only permitted to be moved relative to the wheel swinging member 32 without causing the heel swinging member 32 to be swung relative to the circuit board 31. Under this circumstance, all of the first switch element 311, the second switch element 312, the third switch element 313, the fourth switch element 314 and the push switch element will no longer be erroneously triggered.

Moreover, when the wheel module 3 is operated in the swinging mode, an additional external force greater than the second elastic force of the second elastic member 35 should be exerted on the wheel 33 in order to swing the wheel swinging member 32 relative to the circuit board to trigger the corresponding switch element 311~314.

Figure 8B:
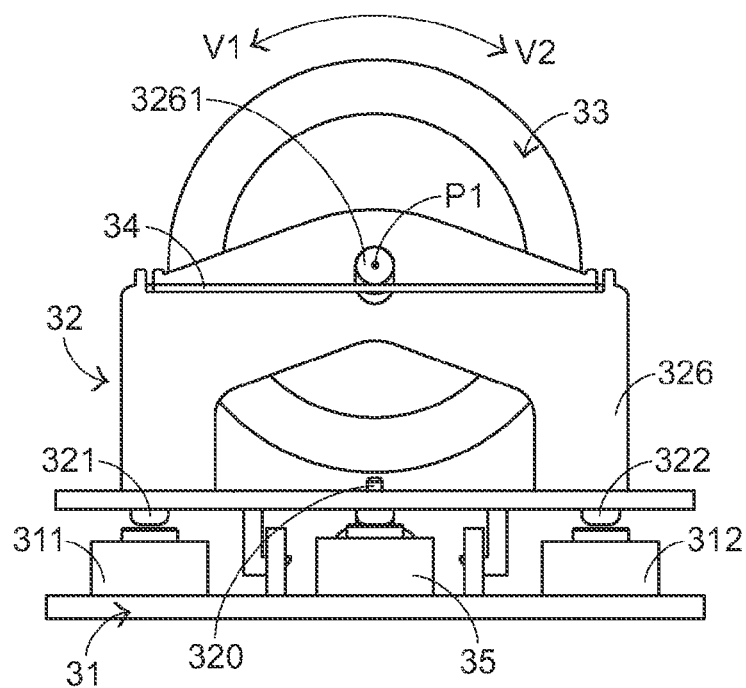
FIG. 8B schematically illustrates the wheel module of FIG. 7, in which the wheel module is operated in a rotating mode.

FIG. 8B schematically illustrates the wheel module of FIG. 7, in which the wheel module is operated in a rotating mode. In a case that the external force F exerted on the wheel 33 is eliminated, the wheel module 3 is operated in a rotating mode. In response to the first elastic force provided by the first elastic member 34, the both ends of the wheel shaft 332 are moved to the first position P1 of the first position-limiting slot 3261 and the second position-limiting slot 3271. Meanwhile, the convex structure 320 of the wheel swinging member 32 is separated from the concave structures 333 of the operating surface 331 of the wheel 33, so that the wheel 33 is rotatable relative to the wheel swinging member 32. That is, when the he concave structures 333 of the operating surface 331 of the wheel 33 is separated from the convex structure 320 of the wheel swinging member 32, the wheel module 3 is operated in a rotating mode.

By the way, when the user wants to trigger any of the first switch element 311, the second switch element 312, the third switch element 313, the fourth switch element 314 and the push switch element, the user may firstly exert the external force F to press down the wheel 33, so that the wheel swinging member 32 is operated in the swinging mode. Then, the additional external force is exerted on the wheel 33 to tilt the wheel 33 in the corresponding direction or move the wheel 33 downwardly. Consequently, even if the force is improperly exerted on the wheel 33, the wheel 33 is not synchronously rotated. Under this circumstance, the rotation of the wheel 33 and the swinging action or downward motion of the swing 33 do not occur simultaneously. As a consequence, the electronic device in communication with the input device will not simultaneously receive two or more control signals. Since the electronic device can judge which command should be executed, the possibility of resulting in the erroneous operation will be minimized.

The configurations of the wheel module in the above two embodiments are presented herein for purpose of illustration and description only. In the wheel module, the number and the locations of the switch elements, the number and locations of the triggering parts of the wheel swinging member, and the material, number and location of the elastic member may be varied according to the practical requirements.

Figure 9:
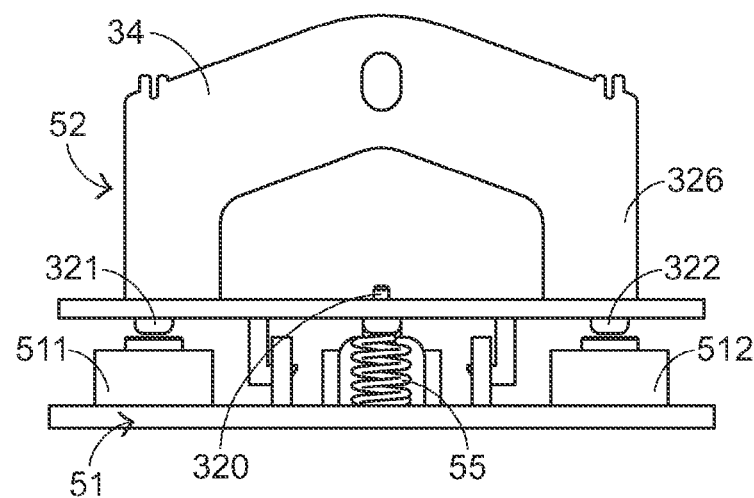
FIG. 9 schematically illustrates the circuit board, the second elastic member and the wheel swinging member of a wheel module according to another embodiment of the present invention.

FIG. 9 schematically illustrates the circuit board, the second elastic member and the wheel swinging member of a wheel module according another embodiment of the present invention. Similarly, a first switch element 511, a second switch element 512, a third switch element and a fourth switch element are disposed on the circuit board 51. Due to the viewpoint, the third switch element and the fourth switch element are not shown. In this embodiment, the second elastic member 55 is a spring, which is arranged between the circuit board 51 and the wheel swinging member 52. As is understood from FIG. 9, the second elastic members 24 and 35 used in the first embodiment and the second embodiment may be replaced by springs.

Figure 10:
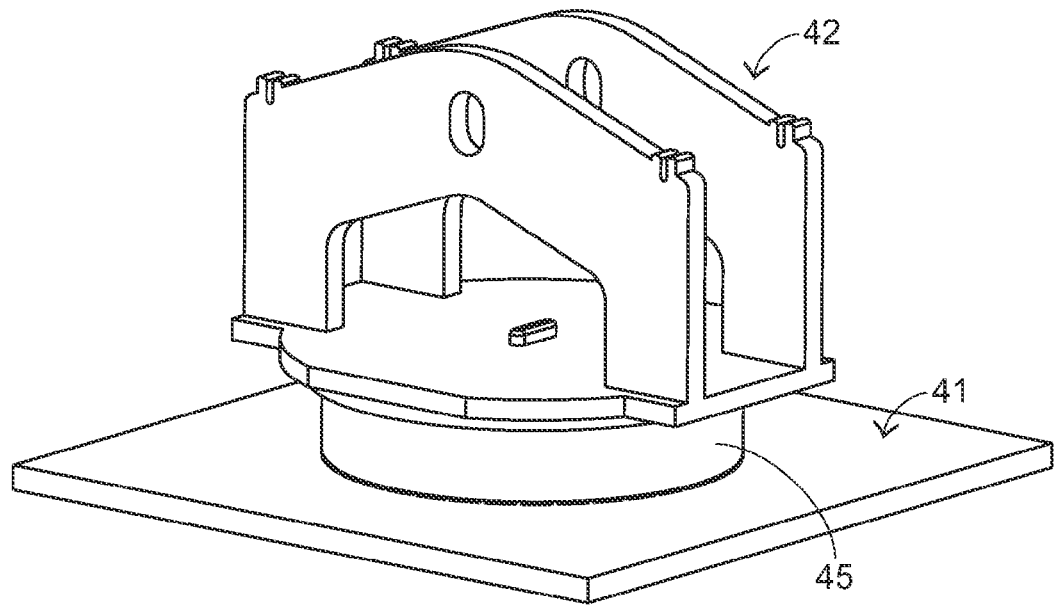
FIG. 10 schematically illustrates the relationship between the circuit board, the second elastic member and the wheel swinging member of a wheel module according to a further embodiment of the present invention.
Figure 11:
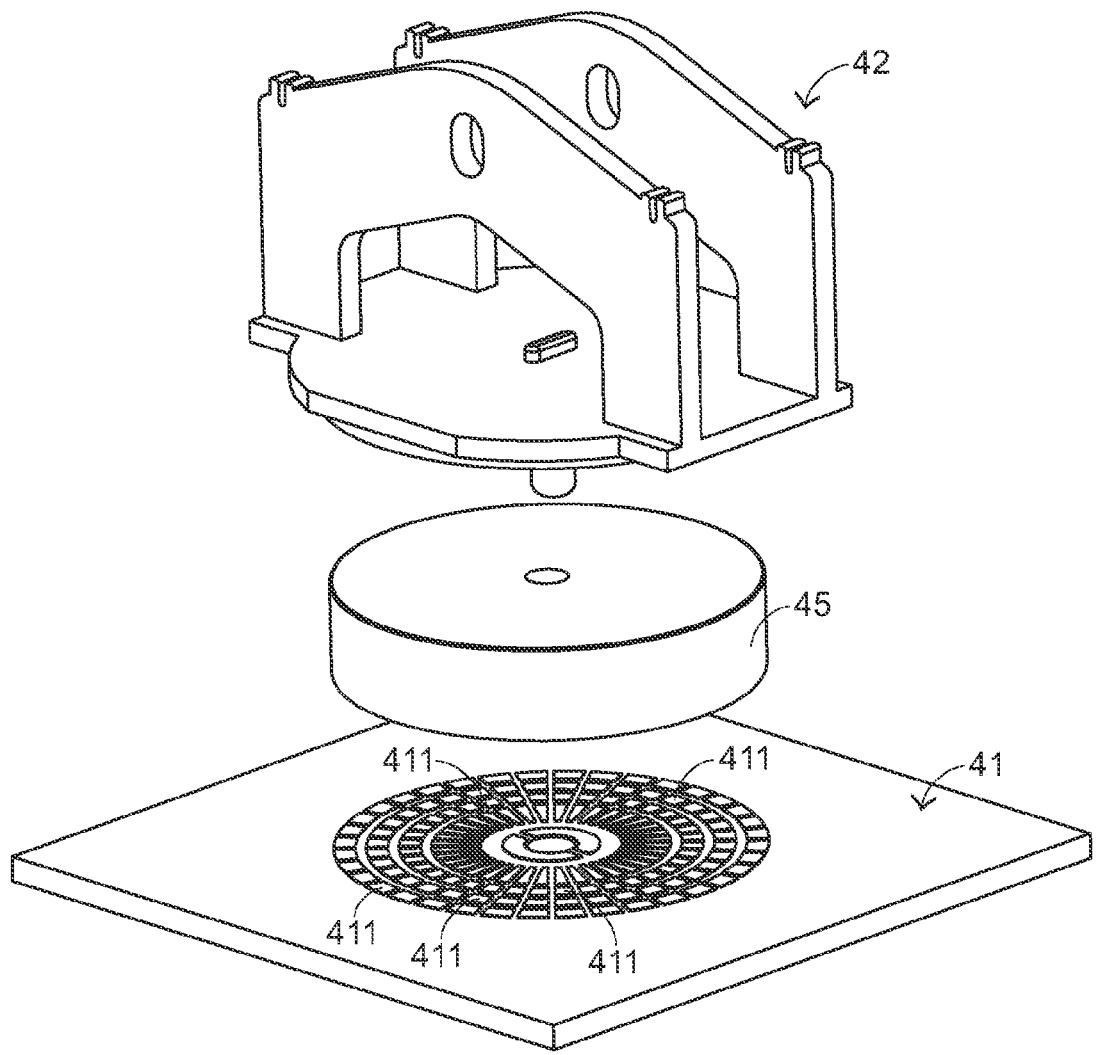
FIG. 11 is a schematic three-dimensional exploded view illustrating the relationship between the circuit board, the second elastic member and the wheel swinging member of the wheel module as shown in FIG. 10.

FIG. 10 schematically illustrates the relationship between the circuit board, the second elastic member and the wheel swinging member of a wheel module according to a further embodiment of the present invention. FIG. 11 is a schematic three-dimensional exploded view illustrating the relationship between the circuit board, the second elastic member and the wheel swinging member of the wheel module as shown in FIG. 10. As shown in FIGS. 10 and 11, a plurality of switch elements 411 are disposed on the circuit board 41. These switch elements 411 are uniformly distributed on the circuit board 41 in 360-degree orientations. In addition, the second elastic member 45 is arranged between the circuit board 41 and the wheel swinging member 42. Preferably, the switch elements 411 are resistive pressure sensors or capacitive pressure sensors. An example of the second elastic member 45 is a conductive rubbery article.

When the wheel (not shown) on the wheel swinging member 42 is moved by the user to allow the wheel swinging member 42 to be swung in a specified direction, the second elastic member 45 is compressed to touch a corresponding switch element 411 and trigger the corresponding switch element 411. When the user stops moving the wheel (not shown) on the wheel swinging member 42, the second elastic force resulting from the compressed second elastic member 45 causes the wheel swinging member 42 to be returned to the original position. Moreover, since the switch elements 411 are uniformly distributed on the circuit board 41 in 360-degree orientations, the control signal generated when the corresponding switch element 411 is triggered may be vector-oriented. In such way, the wheel module of the present invention can provide a joystick function.

Figure 12:
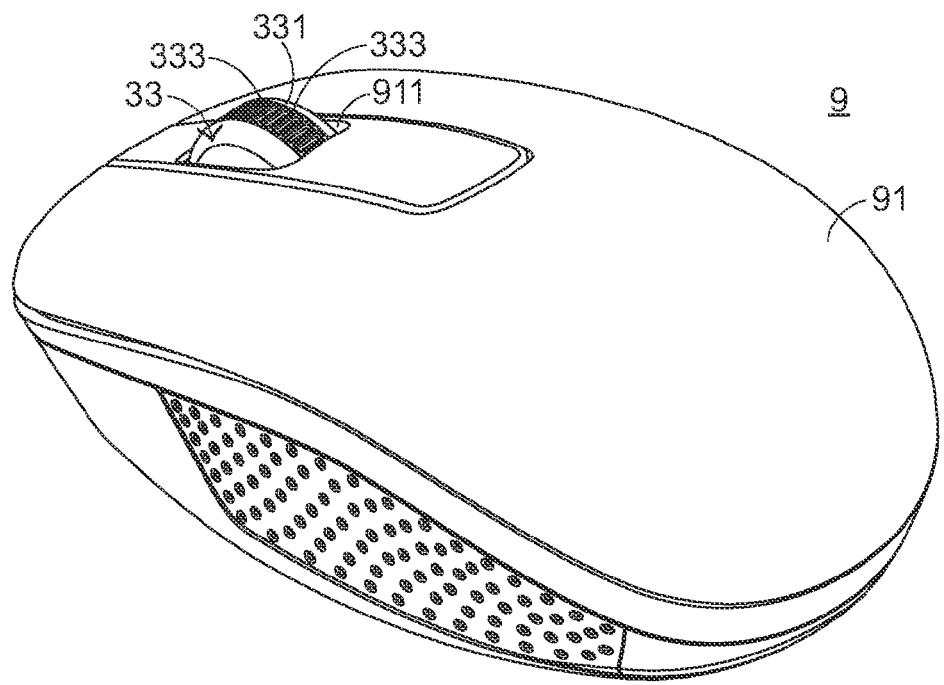
FIG. 12 is a schematic perspective view illustrating a mouse device having the wheel module according to the second embodiment of the present invention.
Figure 13:
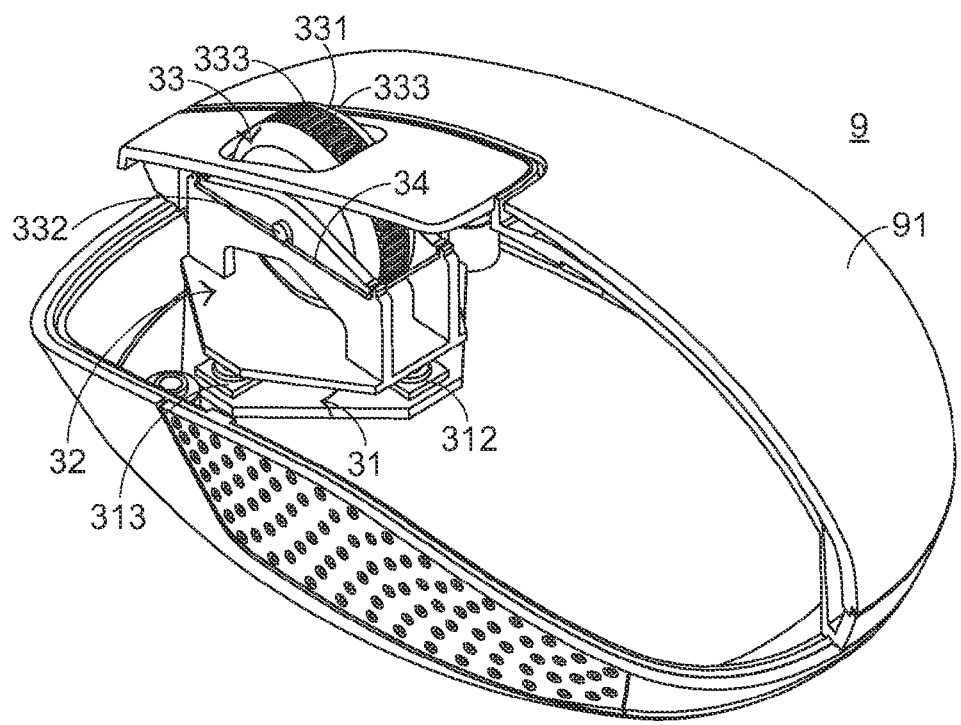
FIG. 13 is a schematic perspective view illustrating the internal portion of the mouse device as shown in FIG. 12.

FIG. 12 is a schematic perspective view illustrating a mouse device having the wheel module according to the second embodiment of the present invention. FIG. 13 is a schematic perspective view illustrating the internal portion of the mouse device as shown in FIG. 12. Please refer to FIGS. 12 and 13. The mouse device 9 has a casing 91. When the casing 91 is held on the palm of a user's hand, the user may move the mouse device. In addition, an opening 911 is formed in a top surface of the casing 91. Through the opening 911, the wheel 33 of the wheel module 3 is partially exposed outside the casing 91. Consequently, the wheel 33 exposed outside the casing 91 can be rotated or pressed down by the user's finger. Of course, the wheel module of the first embodiment may be also applied to a mouse device. The configurations of the mouse device having the wheel module of the first embodiment are similar to those of the mouse device of FIGS. 12 and 13, and are not redundantly described herein.

It is noted that the applications of the wheel module in the above embodiment of this invention are presented herein for purpose of illustration and description only. Those skilled in the art will readily observe that numerous modifications and alterations may be made while retaining the teachings of the invention. By retaining the teachings of the above embodiments, the wheel module of the present invention may be applied in other input devices such as keyboard devices or personal digital assistants (PDA).

From the above description, the wheel module for the input device of the present invention has the following benefits. Firstly, since the wheel of the wheel module can be locked, when the joystick function is used, the wheel will not be carelessly rotated by improperly applying the force on the wheel. Secondly, since the wheel module has sufficient number of switch elements, the functions of operating the wheel module are more diverse.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wheel module for an input device, said wheel module comprising:
   a circuit board, wherein at least one switch element is installed on said circuit board; a wheel swinging member disposed over said circuit board, so that said at least one switch element is arranged between said circuit board and said wheel swinging member; a wheel disposed on said wheel swinging member,
   wherein when said wheel is moved downwardly relative to said wheel swinging member by a specified distance in response to an external force exerted on said wheel,
   an operating mode of said wheel module is switched from a rotating mode to a swinging mode;
   and a first elastic member for providing a first elastic force to said wheel, wherein when said external force exerted on said wheel is eliminated, said first elastic force causes said wheel to be moved upwardly relative to said wheel swinging member,
   wherein when said wheel module is operated in said rotating mode, said wheel is rotatable relative to said wheel swinging member,
   wherein when said wheel module is operated in said swinging mode and said wheel is tilted in a specified direction, said wheel swinging member is synchronously swung relative to said circuit board to trigger said at least one switch element,
   wherein said wheel has an operating surface to be manipulated by a user, and a friction-enhancing member is disposed on a to surface of said wheel swinging member, wherein when said wheel module is operated in said swinging mode, said wheel is contacted with said friction-enhancing member.

2. The wheel module according to claim 1 wherein said wheel swinging member has a first supporting member and a second supporting member, wherein said wheel has a wheel shaft, and both ends of said wheel shaft are supported by said first supporting member and said second supporting member, respectively.

3. The wheel module according to claim 2 further comprising an encoder, wherein when said wheel is rotated, said encoder generates a corresponding rotation signal.

4. The wheel module according to claim 2 wherein said first supporting member has a first position-limiting slot, said second supporting member has a second position-limiting slot, and said both ends of said wheel shaft are inserted into said first position-limiting slot and said second position-limiting slot, respectively, wherein said both ends of said wheel shaft are limited to be moved within said first position-limiting slot and said second position-limiting slot.

5. The wheel module according to claim 4 wherein said first elastic member is an elastic strip, which is disposed around and fixed on said first supporting member and said second supporting member for supporting said both ends of said wheel shaft.

6. The wheel module according to claim 1 wherein said at least one switch element comprises a first switch element, a second switch element, a third switch element and a fourth switch element, which are respectively located at a front side, a rear side, a left side and a right side of said circuit board, wherein a first triggering part, a second triggering part, a third triggering part and a fourth triggering part are respectively disposed on a bottom surface of said wheel swinging member at positions corresponding to said first switch element, said second switch element, said third switch element and said fourth switch element.

7. The wheel module according to claim 1 further comprising a second elastic member, which is arranged between said wheel swinging member and said circuit board for providing a second elastic force to said wheel swinging member.

8. The wheel module according to claim 7 wherein an elasticity coefficient of said second elastic member is greater than an elasticity coefficient of said first elastic member.

9. The wheel module according to claim 7 wherein said second elastic member is a push switch element, wherein corresponding to said push switch element, a push triggering part is disposed on a bottom surface of said wheel swinging member.

10. The wheel module according to claim 7 wherein said second elastic member is made of a rubbery material.

11. The wheel module according to claim 1 wherein said at least one switch element is a resistive pressure sensor or a capacitive pressure sensor.

12. The wheel module according to claim 1 wherein said input device further comprises a casing, and an opening is formed in a top surface of said casing, wherein said wheel is partially exposed outside said casing through said opening.

13. The wheel module according to claim 1 wherein said input device is a mouse device, a keyboard device or a mobile communication device.

* * * * *